J. N. KAUFHOLZ.
MACHINE FOR MAKING VALVE-BUCKETS FOR PUMPS.
No. 191,685. Patented June 5, 1877.
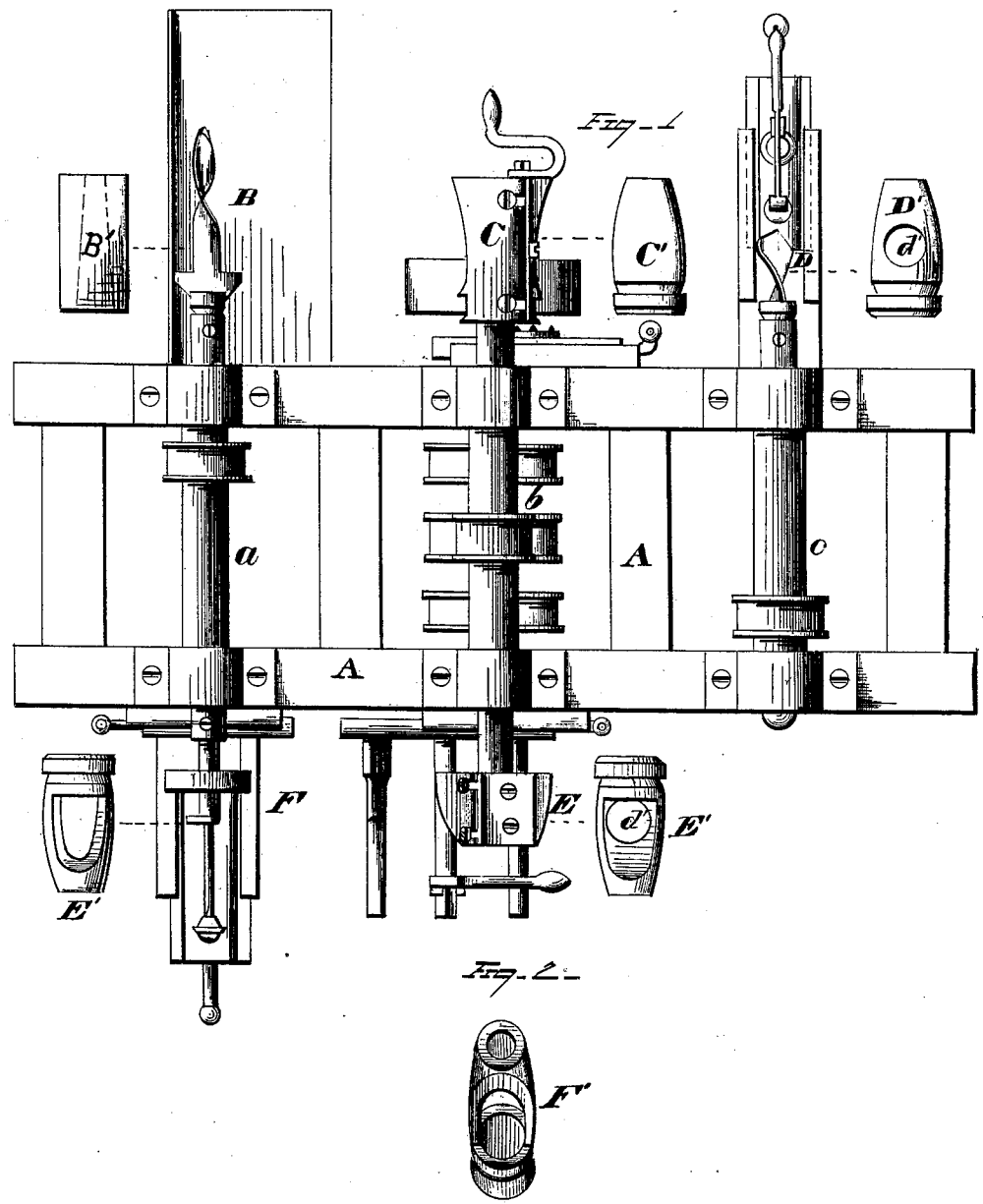

UNITED STATES PATENT OFFICE.

JOHN N. KAUFHOLZ, OF CHATTANOOGA, TENNESSEE.

IMPROVEMENT IN MACHINES FOR MAKING VALVE-BUCKETS FOR PUMPS.

Specification forming part of Letters Patent No. 191,685, dated June 5, 1877; application filed September 30, 1876.

*To all whom it may concern:*

Be it known that I, JOHN N. KAUFHOLZ, of Chattanooga, in the county of Hamilton and State of Tennessee, have invented certain new and useful Improvements in Machines for Manufacturing Valve-Buckets for Pumps; and I do hereby declare the following to be a full, clear, and exact description of the invention, such as will enable others skilled in the art to which it pertains to make and use it, reference being had to the accompanying drawings, which form part of this specification.

My invention relates to a machine and process for manufacturing valve-buckets for pumps, and the like.

In the drawing, Figure 1 shows a plan view of a machine embodying my invention, with the product of each tool shown adjacent thereto in side elevation.

My invention consists in the following parts and combinations, as hereinafter specified and claimed, wherein A is any suitable frame, constructed to carry the working parts, as herein described. These working parts are the tools or devices B, C, D, E, and F. These tools or devices follow each other consecutively in their operation of carrying out my process, as will hereinafter appear.

B, or the first tool, is a conical auger or boring instrument, which operates to make a conical bore or hollow in the raw block B'. Any suitable device may be employed whereby the block B' is fed to the tool B. After said tool B has finished its operation the block B' is operated upon by the tool C. The tool C is a revolving cutter, operating in the ordinary manner of a revolving planing-knife. It is shaped and fashioned so as to produce a proper contour or fashion to the outside of the block, as shown at C'. The block C' is revolved beneath the cutter C until its operation is completed. The feeding device which I have shown consists of a bed or table moving at right angles to the revolving blade C, upon which the block C' is fastened, whereby the said block is passed beneath the blade C and revolved in the meantime.

The next step of my process consists in applying the block C' to the tool D, which is a simple auger or boring-tool, whose office and function is to produce the hole $d'$, substantially as shown at E'. The block D' is applied to the said tool E, by which it is cut on opposite sides by being passed under said knife E in the same manner as described regarding the knife C.' This step being completed, the block E' is submitted to the tool F, the office of which is to finish the floor or valve-seat. The tool F is a revolving knife, substantially as shown in the drawings at F. It has a cutting-edge at right angles to the arbor supporting it, and also a short cutting-edge at the end of this first cutting-edge, which is parallel to the arbor or supporting-shaft. It is made of a size just large enough to pass through the hole in the end of the block. When at its proper place for cutting the valve-seat it is caused to revolve rapidly, while, at the same time, the wooden block or bucket is given a vibrating motion in a direction across the length of the shaft which bears the knife F, so that as the knife revolves this vibration of the block will cause the knife to cut out straight through the bucket in one direction, leaving the parts intact which form the bail. In this way it cuts the valve-seat.

It is apparent, also, that, while the block has a vibrating motion, permitting the knife to cut through the sides of the block, it also has a slightly-vibrating motion in a right-angular direction, so as to permit the knife to cut a sufficient seat just inside of the bails. By this means the floor or seat of the valve can be finished by the same tool without injury to or interference with the remaining portion of the valve or frame of the bucket. This step finishes my process.

I have shown in the drawings a machine where the tools B, C, D, E, and F are arranged on both sides thereof. In such a machine it would be necessary to carry the block from one side of the machine to the other during the process of completion.

I do not limit myself in any manner to this arrangement, as it is apparent the tools B, C, D, E, and F may be arranged in line either vertically or horizontally or in a circle, or in any desired or convenient manner.

In the machine shown in Fig. 1 there are three shafts, $a \, b \, c$, upon the ends of which are attached the tools B, C, D, E, and F. These shafts are connected and driven by any suitable gear or pulley device.

In the drawings, Fig. 2 represents an isometric view of the completed product of my machine, looking down upon the valve-seat.

What I claim is—

A machine for manufacturing pump-valve buckets, consisting in the combination, with suitable actuating mechanism, of the tools B, C, D, E, and F, whereby the raw material is respectively bored in length, dressed in exterior, bored in cross-dimension, cut with side arches having square bases, and, finally, formed with a valve-seat, substantially as and for the purpose described.

In testimony whereof I have signed my name to this specification in the presence of two subscribing witnesses.

JOHN N. KAUFHOLZ.

Witnesses:
FRANCIS TOUMEY,
WELLS W. LEGGETT.